United States Patent
Ohyama et al.

(10) Patent No.: US 6,977,962 B2
(45) Date of Patent: Dec. 20, 2005

(54) METHOD AND APPARATUS FOR DECODING AND CODING IMAGES WITH SCENE CHANGE DETECTION FUNCTION

(75) Inventors: Tatsushi Ohyama, Gifu (JP); Hideki Yamauchi, Gifu (JP)

(73) Assignee: Sankyo Electric Co., Ltd., Moriguchi (JP)

( * ) Notice: Subject to any disclaimer, the term of this patent is extended or adjusted under 35 U.S.C. 154(b) by 541 days.

(21) Appl. No.: 10/167,673

(22) Filed: Jun. 10, 2002

(65) Prior Publication Data

US 2002/0191697 A1 Dec. 19, 2002

(30) Foreign Application Priority Data

Jun. 19, 2001 (JP) .............................. 2001-185593

(51) Int. Cl.$^7$ ............................................. H04N 7/12
(52) U.S. Cl. ................... 375/240.11; 382/249; 348/700
(58) Field of Search ...................... 375/240.14, 240.11, 375/240.19, 240.18; 382/166, 100, 248, 249; 348/700

(56) References Cited

U.S. PATENT DOCUMENTS

| 5,592,226 | A | * | 1/1997 | Lee et al. ............... 375/240.14 |
| 5,808,683 | A | * | 9/1998 | Tong et al. ............ 375/240.11 |
| 6,125,201 | A | * | 9/2000 | Zador ........................ 382/166 |
| 6,542,619 | B1 | * | 4/2003 | Jafarkhani et al. .......... 382/100 |

FOREIGN PATENT DOCUMENTS

| JP | 05-103313 | 4/1993 |
| JP | 09-312829 | 12/1997 |

* cited by examiner

*Primary Examiner*—Gims Philippe
(74) *Attorney, Agent, or Firm*—Christensen O'Connor Johnson Kindness PLLC (57) ABSTRACT

LL subbands of first and second intermediate images obtained by an inverse quantizer are stored in an intermediate image memory. A scene change judging unit compares data stored in the intermediate image memory and thereby determines whether there is a scene change or not.

3 Claims, 5 Drawing Sheets

METHOD AND APPARATUS FOR DECODING AND CODING IMAGES WITH SCENE CHANGE DETECTION FUNCTION

BACKGROUND OF THE INVENTION

1. Field of the Invention

The present invention relates to an image processing technology, and it particularly relates to an image decoding and image coding technology for detecting scene changes in moving pictures.

2. Description of the Related Art

In the reproduction of moving images, the detection of a change in the scene is called scene change detection.

Normally, the scene change detection is used to efficiently carry out an index search job by detecting a desired scene at a reproducing apparatus or an editing apparatus. Scene change detection techniques normally utilize information on any change that exists between image frames. The known techniques include use of the correlation coefficients applicable between image frames or use of the difference between image frames by statistically processing the pixel values contained in the image frames.

In these conventional techniques, a scene change is normally detected by comparing intensity components of the pixel values of image frames before or after the presently displayed image.

A scene change in moving images compressed by a technique like MPEG (Moving Picture Experts Group) is detected by a processing, such as checking on the above-described correlation coefficient for image data obtained by completely decoding the coded image once. The scene change detection by this technique, therefore, requires large memory area and much computation. Thus, there is room for improvement in detection efficiency.

SUMMARY OF THE INVENTION

The present invention has been made in view of foregoing circumstances, and an object thereof is to provide an image decoding technique and an image coding technique that realize efficient scene change detection.

When a scene change is to be detected, images to be detected are normally those obtained after the completion of decoding by the time of reproduction. In preferred embodiments described hereinafter, however, intermediate images are acquired and utilized without the completion of decoding at the time of reproduction. Hereinafter, a final image obtained upon completion of decoding is referred to as a "decoded image." In that case, the decoded image is to be understood not to include intermediate images. Moreover, an image which has not been coded is referred to as an "original image" and this image is distinguished from the decoded image that is generated by the decoding of a coded image.

The intermediate image is an image of an intermediate hierarchy that is generated in a process of hierarchizing and coding the original image, and this intermediate-hierarchical image generally appears during the decoding, also. The image of an intermediate hierarchy, which often occurs naturally in the hierarchizing process, can be taken advantage of and is suitably used in the present invention. Hereinafter, any simple reference to the intermediate image must be understood to include the "image of an intermediate hierarchy" also. Hereinafter, the intermediate image which is generated during decoding or coding will be described as an image formed by subband components generated when coded by a two-dimensional wavelet transform.

A preferred embodiment according to the present invention relates to an image decoding apparatus. This apparatus, which reproduces moving images by successively decoding a stream of coded images, includes an image memory and a scene change judging unit. The image memory stores a first intermediate image generated during decoding of a first image frame included in the stream of coded images (referred to as a "first intermediate image" hereinafter), and a second intermediate image generated during decoding of a second image frame that is to be reproduced after the first image frame included in the stream (referred to as a "second intermediate image" hereinafter). The scene change judging unit determines whether or not there is a scene change between the first intermediate image and the second intermediate image by comparing the first and second intermediate images stored in the image memory.

The scene change judging unit may specify an image frame to be displayed, based on a scene change thus detected.

According to this preferred embodiment, at the time of scene change detection, intermediate images generated secondarily and temporarily during decoding can be utilized effectively. Thus, there is no need to wait until completion of the decoding and the starting timing for a detection processing is very quick, so that an efficient scene change detection processing is realized.

Another preferred embodiment according to the present invention relates to an image coding apparatus. This apparatus, which generates a stream of coded images by successively coding moving images, includes an image memory and a scene change judging unit. The image memory stores a first intermediate image generated during coding of a first image frame included in a stream of moving images (also referred to as a "first intermediate image" hereinafter), and a second intermediate image generated during coding of a second image frame that is to be coded after the first image frame included in the stream, and the scene change judging unit determines whether or not there is a scene change between the first intermediate image and the second intermediate image by comparing the first and second intermediate images stored in the image memory.

The image coding apparatus may further include an index adding unit which, when a scene change is detected by the scene change judging unit, records information of the detected scene change into the stream of coded images in a manner such that the information is associated with at least one of the first image frame and the second image frame.

Still another preferred embodiment according to the present invention relates to an image decoding method. This method, by which to reproduce moving images by successively decoding a stream of coded images, includes: storing a first intermediate image and a second intermediate image generated during decoding; and determining whether or not there is a scene change between those images by comparing those intermediate images stored in said storing.

Still another preferred embodiment according to the present invention relates to an image coding method. This method, by which to code successively original images, includes: storing a first intermediate image and a second intermediate image generated during coding; and determining whether or not there is a scene change between those images by comparing those intermediate images stored in said storing.

It is to be noted that any arbitrary replacement or substitution of the above-described structural components and the steps, expressions replaced or substituted in part or whole between a method and an apparatus as well as addition thereof, and expressions changed to a computer program, a data structure, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The following preferred embodiments relate to an image processing of coding and decoding by making use of JPEG (Joint Photographic Experts Group) 2000.

Figure 1:
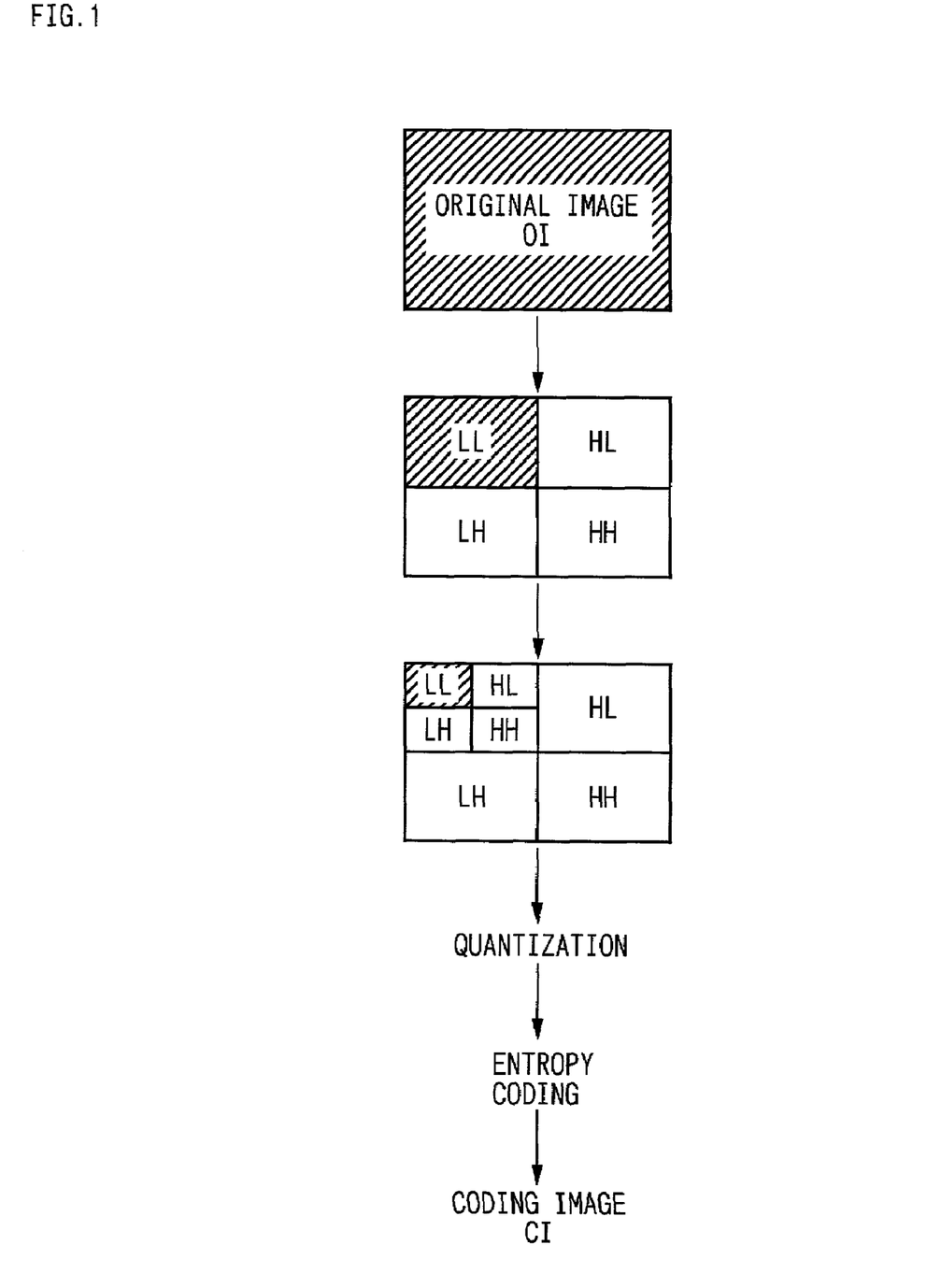
FIG. 1 shows a procedure of image coding according to the JPEG2000 standards.

FIG. 1 shows a procedure of image coding according to the JPEG2000 standards. An original image OI is hierarchized by a wavelet transformer. The wavelet transformer in JPEG2000 uses a Daubechies filter. This filter, which operates simultaneously as a low-pass filter and a high-pass filter in each of x and y directions of the original image, divides a single image into four frequency subbands. These subband components are an LL subband, which has low-frequency components in both x and y directions, HL and LH subbands, which have a low-frequency component in either x or y direction and a high-frequency component in the other direction, and an HH subband, which has high-frequency components in both x and y directions. The numbers of pixels in the vertical and horizontal directions of each subband component are both ½ of those of the image before processing, and one time of filtering produces subband images whose resolution, or image size, is ¼ of the original image.

The wavelet transformer carries out another filtering on the LL subband of the subband components obtained as described above, thus dividing it further into four subband components of LL, HL, LH and HH. The filtering is performed a predetermined number of times.

Then, the data are quantized by a quantizer, and the quantized data are entropy-coded into a coded image CI. A decoded image DI are obtained by carrying out a processing in reverse order on the coded image CI generated by the above processing.

First Embodiment

Figure 2:
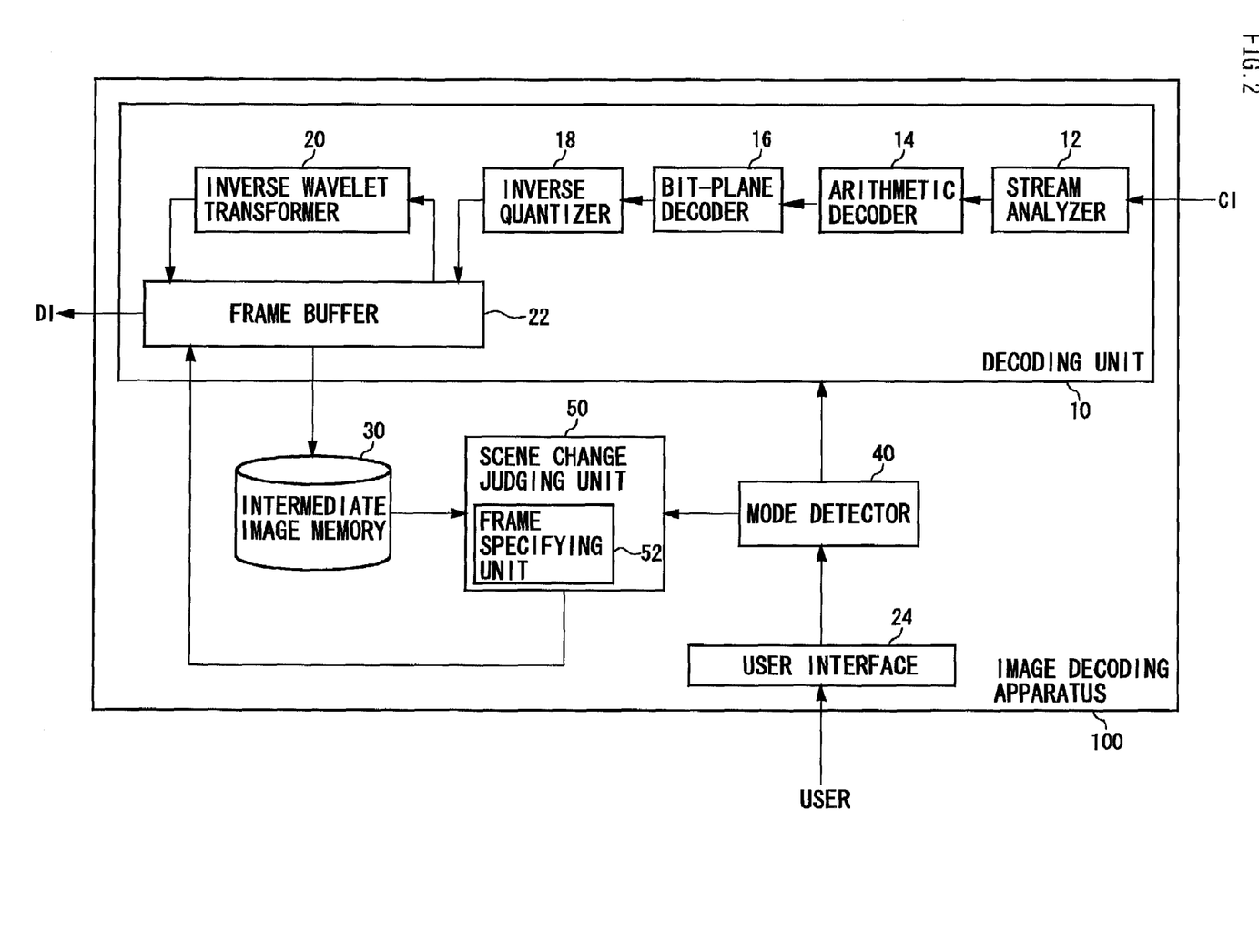
FIG. 2 shows a structure of an image decoding apparatus according to a first embodiment of the present invention.

FIG. 2 shows a structure of an image decoding apparatus 100 according to a first embodiment of the present invention. The image decoding apparatus 100 comprises principally a decoding unit 10, a user interface 24, an intermediate image memory 30, a mode detector 40, and a scene change judging unit 50. The decoding unit 10, which takes charge of a decoding processing based on JPEG2000 specifications, includes a stream analyzer 12 which processes coded images CI successively, an arithmetic decoder 14, a bit-plane decoder 16, an inverse quantizer 18, an inverse wavelet transformer 20, and a frame buffer 22 which is utilized as work area. The intermediate image memory 30 stores a first intermediate image and a second intermediate image. The mode detector 40 detects either of "normal mode" and "lead frame select mode" whichever has been selected by the user. In the normal mode, normal reproduction is carried out by decoding coded images in regular succession. In the "lead frame select mode", a scene change is detected. The scene change judging unit 50 judges whether or not there is a scene change by comparing the first intermediate image and the second intermediate image in storage. The scene change judging unit 50 further includes a frame specifying unit 52 which specifies a top image frame after the scene change.

As a normal reproduction processing, coded images CI undergo the processings of the stream analyzer 12 and thereafter, so that decoded images DI are outputted finally.

On the other hand, a processing characteristic of the present embodiment lies in a process that realizes scene change detection. Namely, when the "lead frame select mode" is selected by the user via the user interface 24, which is, for example, a button provided on the apparatus, the mode detector 40 detects the "lead frame select mode" and instructs the decoding unit 10 to carry out the processing of the lead frame select mode.

In the "lead frame select mode", the LL subband of the first intermediate image obtained by the inverse quantizer 18 is first stored in the intermediate image memory 30. Then the LL subband of the second intermediate image obtained by the inverse quantizer 18 following the first intermediate image is stored in the intermediate image memory 30.

The scene change judging unit 50 determines whether or not there is a scene change between these images by correlating data on the intermediate images thus stored.

When the subband components are correlated at the scene change judging unit 50, the subband component to be used may be LH, HL or HH instead of LL. Moreover, a plurality of subband components may be utilized, too. In such a case, data to be stored in the intermediate image memory 30 are the data on the corresponding subband components. In any case, the images to be correlated are smaller in size than the decoded images, so that the computation load is light and there arises no redundant processing because the intermediate images are automatically generated during decoding.

When the presence of a scene change is confirmed by the scene change judging unit 50, the frame specifying unit 52 specifies a top image frame after the scene change and instructs the decoding unit 10 to output the image frame. Upon receipt of this instruction, the inverse wavelet transformer 20 decodes the intermediate image of the above-described image frame stored in the frame buffer 22 and outputs a decoded image DI.

If the decoded image DI outputted is the top image of a scene desired by the user, the user instructs, via the user interface 24, the mode detector 40 to stop the "lead frame select mode" and shift to the "normal reproduction mode."

When no instructions arrives from the user for a shift to the "normal reproduction mode", the "lead frame select mode" is continued and the detection of a top image of the next scene continues. During this time, the decoded images DI continues to be outputted until the next scene change is detected.

Where scene change detection continues, the data of the first intermediate image are discarded, the data of the second intermediate image are stored as new data of the first intermediate image and a next intermediate image is stored as new data of the second intermediate image. To realize this repetition, the intermediate image memory 30 is only required to have memory area enough to store two intermediate images.

Figure 3:
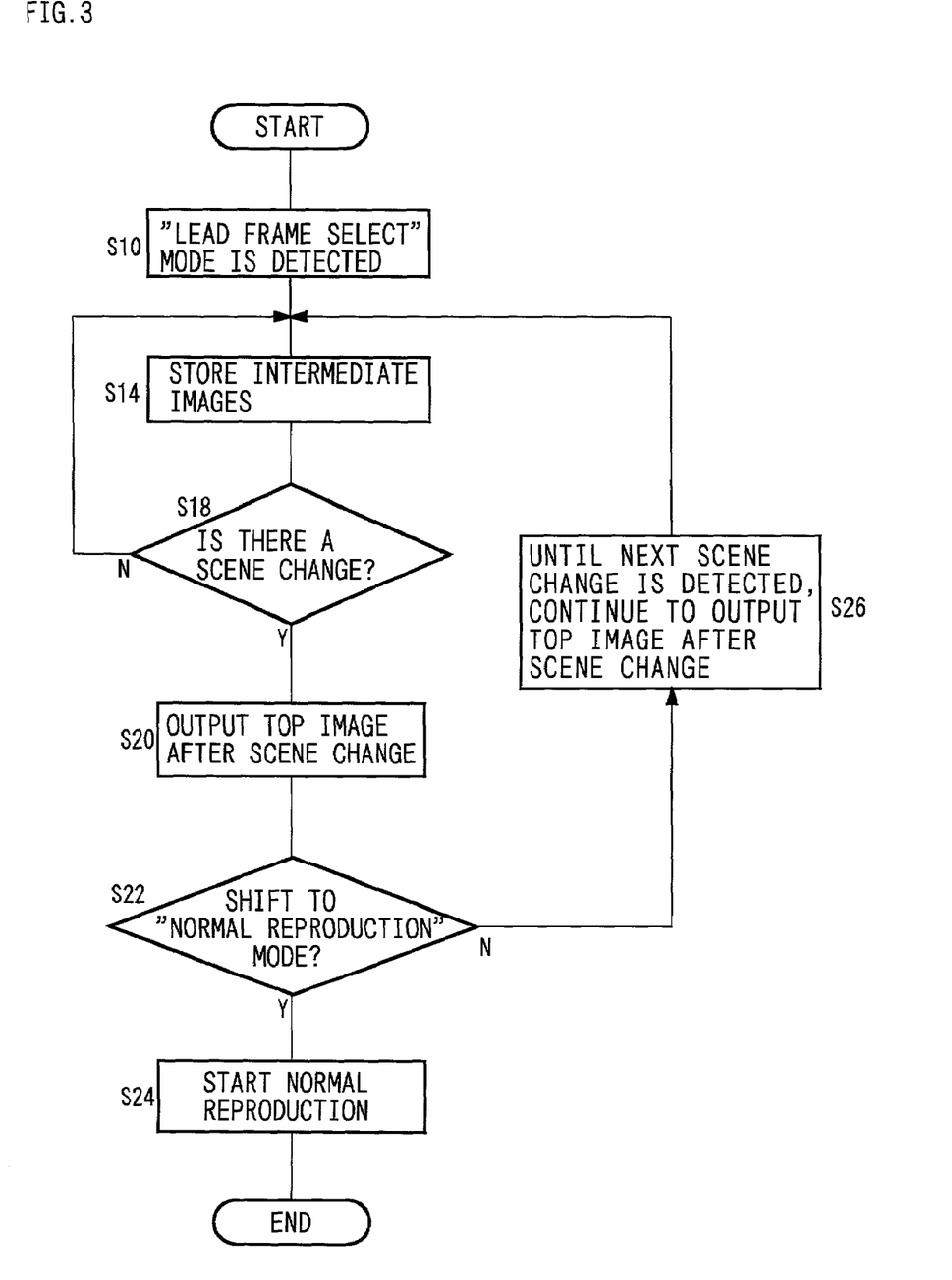
FIG. 3 is a flowchart showing a processing procedure according to the first embodiment of the present invention.

FIG. 3 is a flowchart showing a procedure for scene change detection by the image decoding apparatus 100.

When the "lead frame select mode" is selected by the user and the selection made to that effect is detected by the mode detector 40 (S10), the LL subbands of adjacent intermediate images data are stored in the intermediate image memory 30 (S14). The scene change judging unit 50 determines whether or not there is a scene change by comparing the LL subbands of the intermediate images thus stored (S18). When no scene changes is detected, the scene change judging unit 50 determines again whether a scene change is present or not on the intermediate image data concerning the next image frame (N of S18). When the presence of a scene change is confirmed (Y of S18), a top image after the scene change is outputted (S20). With instructions from the user for a shift to the "normal reproduction mode" (Y of S22), normal reproduction starts from the top image after the scene change (S24). If there is no instructions from the user for a shift to the normal reproduction mode (N of S22), the scene change detection continues and the top image after the scene change detected previously continues to be outputted until a next scene change is detected (S26).

Second Embodiment

Figure 4:
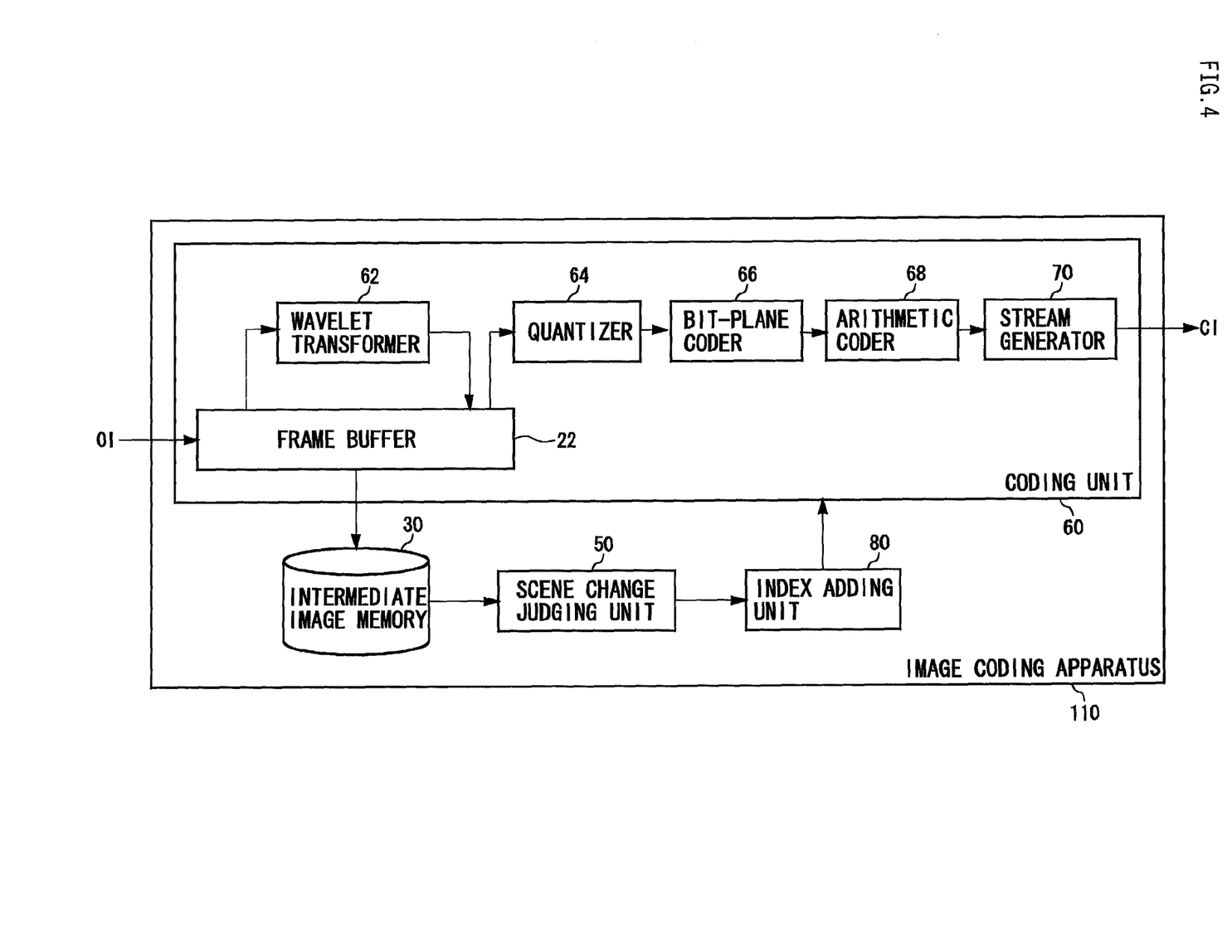
FIG. 4 shows a structure of an image coding apparatus according to a second embodiment of the present invention.

FIG. 4 shows a structure of an image coding apparatus 110 according to a second embodiment of the present invention. The image coding apparatus 110 mainly comprises a coding unit 60, an intermediate image memory 30, a scene change judging unit 50, and an index adding unit 80. The coding unit 60, which takes charge of a coding processing based on the JPEG2000 specifications, includes a wavelet transformer 62 which processes original images OI successively, a quantizer 64, a bit-plane coder 66, an arithmetic coder 68, a stream generator 70, and a frame buffer 22 which is used as work area. The intermediate image memory 30 stores a first intermediate image and a second intermediate image.

Generally, processings of the wavelet transformer 62 and thereafter are carried out on the original image OI, and finally a coded images CI is outputted.

On the other hand, a processing characteristic of the present embodiment lies in the process that realizes scene change detection. First, a first intermediate image and a second intermediate image obtained by the wavelet transformer 62 are stored in the frame buffer 22, and then the LL subbands of the first and second intermediate images stored therein are stored in the intermediate image memory 30.

The scene change judging unit 50 judges whether or not there exists a scene change between these images by correlating the data on the LL subbands thus stored.

Similar to the first embodiment, when these subband components are correlated, the subband component to be utilized may be LH, HL or HH instead of LL. Moreover, a plurality of subband components may be utilized, too. In such a case, data to be stored in the intermediate image memory 30 are the data on the corresponding subband components. In any case, the images to be correlated are smaller in size than the original images, so that the computation load is light and there arises no redundant processing because the intermediate images are automatically generated during coding.

When the presence of a scene change is confirmed by the scene change judging unit 50, the index adding unit 80 instructs the coding unit 60, or the stream generator 70 for instance, to insert scene change information, as an index, into a coded image data stream in a manner such that the scene change information is associated with at least one of the first image frame and the second image frame.

Figure 5:
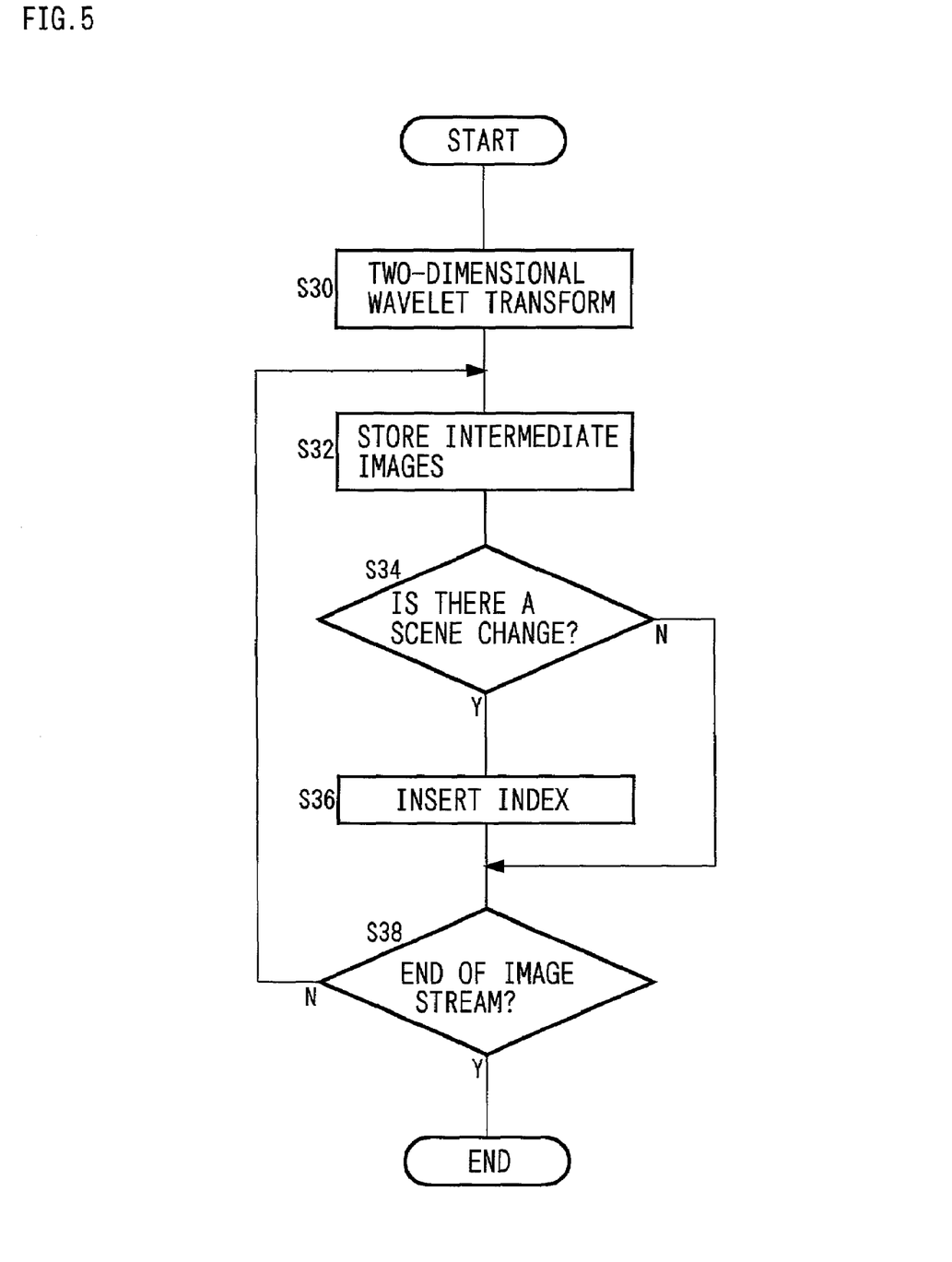
FIG. 5 is a flowchart showing a processing procedure according to the second embodiment of the present invention.

FIG. 5 is a flowchart showing a procedure for scene change detection by the image coding apparatus 110.

The wavelet transformer 62 performs a two-dimensional wavelet transform on an original image OI, so as to generate an intermediate image (S30). The LL subbands of the data on the intermediate images of adjacent image frames are each stored in the intermediate image memory 30 (S32). The scene change judging unit 50 determines whether or not there is a scene change between these image frames (S34). If there is a scene change (Y of S34), the presence of a scene change between these image frames is inserted as an index into the coded image (S36). After the insertion of the index or when the scene change does not exist (N of S34), the scene change detection continues until there is no longer any image stream to be coded (Y of S38).

If there is provided an image coding apparatus as in the second embodiment, the image decoding apparatus 100 according to the first embodiment that determines a scene change on its own will be made somehow useless. Instead, the image decoding apparatus 100 may have an index detector (not shown) which detects an index that indicates the presence of a scene change.

Various component members appear in the following embodiments. In terms of hardware, those embodiments can be realized by a CPU, memory and other LSIs and combined circuit. In terms of software, they are realized by memory-loaded programs or the like with image processing functions. The description in the preferred embodiments mainly concerns functions that are realized in cooperation with such components. Therefore, it should be understood by those skilled in the art that these functions can be realized in a variety of forms by hardware only, software only or by the combination thereof.

Although the present invention has been described by way of exemplary embodiments, it should be understood that many changes and substitutions may be made by those skilled in the art without departing from the scope of the present invention which is defined by the appended claims.

What is claimed is:

1. An image coding apparatus for generating a stream of coded images by successively coding moving images, the apparatus comprising:

an image memory which stores a first intermediate image formed by a subband component generated at a predetermined stage of a coding process by a two-dimensional wavelet transform during coding of a first image frame included in a stream of moving images, and a second intermediate image formed by a subband component generated at a predetermined stage of the coding process by the two-dimensional wavelet transform during coding of a second image frame that is to be coded after the first image frame included in the stream;

a scene change judging unit which determines whether or not there is a scene change between the first intermediate image and the second intermediate image by comparing the first and second intermediate images stored in said image memory; and an index adding unit which, when a scene change is detected by said scene change judging unit, records information of the detected scene change into the stream of coded images in a manner such that the information is associated with at least one of the first image frame and the second image frame.

2. An image coding apparatus according to claim 1, wherein the subband component is an LL subband.

3. An image coding apparatus according to claim 1, wherein the subband component includes a plurality of subband components, and said scene change judging unit determines the presence of a scene change by utilizing a plurality of the subband components.

* * * * *

UNITED STATES PATENT AND TRADEMARK OFFICE
CERTIFICATE OF CORRECTION

PATENT NO. : 6,977,962 B2 Page 1 of 1
DATED : December 20, 2005
INVENTOR(S) : T. Ohyama et al.

It is certified that error appears in the above-identified patent and that said Letters Patent is hereby corrected as shown below:

<u>Title page,</u>
Item [73], Assignee, "Sankyo Electric Co., Ltd.," should read -- Sanyo Electric Co., Ltd., --.

Signed and Sealed this

Fourth Day of April, 2006

JON W. DUDAS
*Director of the United States Patent and Trademark Office*